2 Sheets—Sheet 1.

A. TAPLIN.

Assignor to THE BRISTOL BRASS AND CLOCK COMPANY.

BENT TUBE.

No. 10,859. Reissued Aug. 9, 1887.

Witnesses:
Geo. J. Buchheit Jr.
Theo. L. Popp.

A. Taplin Inventor,
By Wilhelm Bonnet
Attorneys.

N. PETERS, Photo-Lithographer, Washington, D.C.

A. TAPLIN.

Assignor to THE BRISTOL BRASS AND CLOCK COMPANY.

BENT TUBE.

No. 10,859. Reissued Aug. 9, 1887.

Witnesses:
Theo. L. Popp.
Geo. J. Buchheit Jr.

Alvin Taplin Inventor.
By Wilhelm Bonnet.
Attorneys.

N. PETERS, Photo-Lithographer, Washington, D. C.

UNITED STATES PATENT OFFICE.

ALVIN TAPLIN, OF FORESTVILLE, ASSIGNOR TO THE BRISTOL BRASS AND CLOCK COMPANY, OF BRISTOL, CONNECTICUT.

BENT TUBE.

SPECIFICATION forming part of Reissued Letters Patent No. 10,859, dated August 9, 1887.

Original No. 351,479, dated October 26, 1886. Application for reissue filed July 12, 1887. Serial No. 244,123.

DIVISION C.

*To all whom it may concern:*

Be it known that I, ALVIN TAPLIN, a citizen of the United States, residing at Forestville, in the county of Hartford and State of Connecticut, have invented certain new and useful Improvements in the Manufacture of Bent Tubes, of which the following is a specification.

My invention relates to an improvement in the manufacture of bent tubes from sheet metal; and the principal object of my invention is to economize in the manufacture thereof, especially with reference to a saving in stock.

Figure 1:
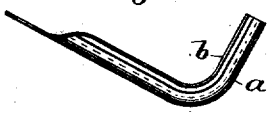
Figure 2:
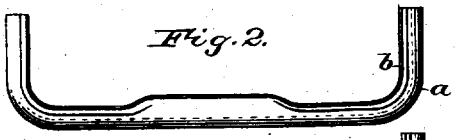
Figure 3:
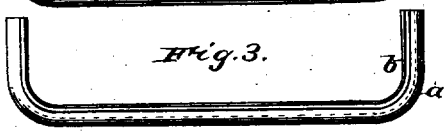
Figure 4:
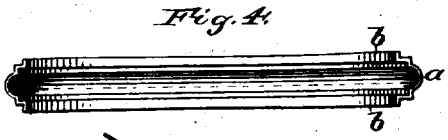
Figure 5:
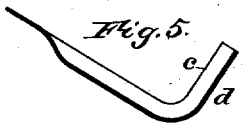
Figure 6:
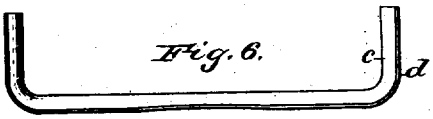
Figure 7:
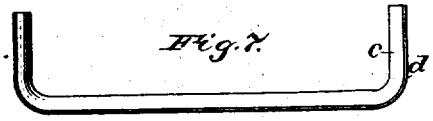
Figure 8:
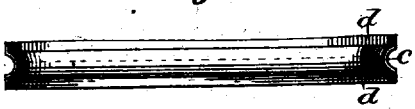
Figure 9:
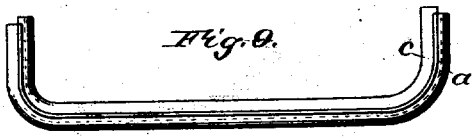
Figure 10:
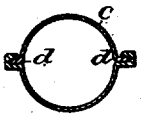
Figure 11:
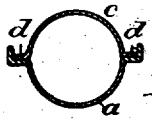
Figure 12:
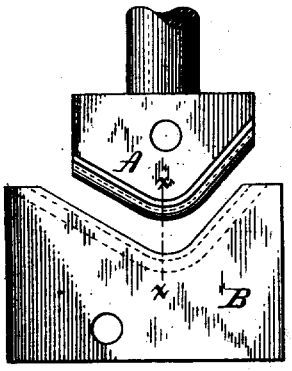
Figure 13:
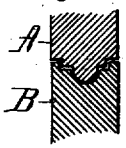
Figure 15:
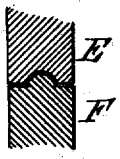
Figure 14:
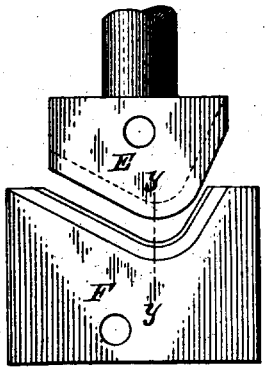
Figure 16:
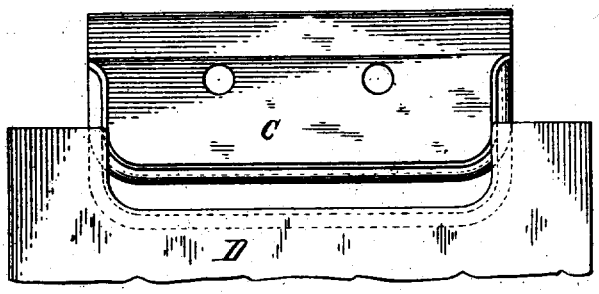
Figure 17:
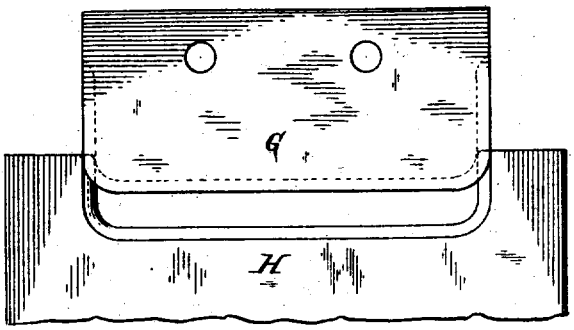

In the accompanying drawings, Figure 1 represents in side elevation a portion of one part of a bent tube showing the result of the first operation upon one blank. Fig. 2 is a side elevation showing a blank which has been thus operated upon at both of its ends. Fig. 3 represents in side elevation one half of a tube which has been operated upon by the final swaging-dies. Fig. 4 is a plan view of the same. Figs. 5, 6, 7, and 8 represent side elevations and a plan view showing corresponding operations upon the blank for the other half of the tube. Fig. 9 represents in side elevation the two parts of the tube thus formed and properly trimmed, so as to match together ready for locking the seam. Fig. 10 is a transverse section of the completed tube. Fig. 11 is a transverse section of said tube in the condition represented in Fig. 9. Fig. 12 is a side elevation of the first swaging-dies for the ends of one half of the tube. Fig. 13 is a transverse section on line *x x* of Fig. 12, showing the confronting faces of the dies of said Fig. 12. Fig. 14 is a side elevation of the first swaging-dies for the ends of the other half of the tube. Fig. 15 is a transverse section on line *y y* of Fig. 14, showing the confronting faces of the dies of said Fig. 14. Fig. 16 is a side elevation of the final swaging-dies for one half of my tube, and Fig. 17 is a corresponding view of the swaging-die for the other half. The sections, Figs. 13 and 15, also correctly represent the confronting faces of the dies, Figs. 16 and 17.

I have illustrated my invention as applied to the manufacture of side tubes for tubular lanterns; but it is applicable to the manufacture of other tubes having a bend or elbow from which a straight or comparatively straight member extends.

Heretofore the side tubes for tubular lanterns have been made in the form represented in cross-section, Figs. 10 and 11, and by means of dies; but instead of having the seam upon both sides follow the same curve, so as to divide the tube at the elbow into what might be termed an "outer" and "inner" half, both seams were formed in one plane, the seam on one side of the tube following the lesser or inner curve, while the seam on the opposite side of the tube followed the greater or outer curve. Such tubes required a special blank whose contour was in substantially U-form, and involved a great waste of stock in cutting out.

I form the tube from two ribbons or straight strips of metal, which I curve and swage at the same time, so as to form an outer and inner half for each tube.

I will first describe the operation for forming the outer half, *a*, of the tube.

One end of a straight strip of metal is placed between the swaging-dies A B, Fig. 12, and subjected to pressure therein, thereby forming an elbow at one end of the tube and swaging the metal into the desired shape, as represented in Fig. 1. The other end of the same blank is then operated upon in like manner in the same die, so as to swage the other elbow, which action will also bend the intermediate portion of the blank into a trough-shaped form, the result of these two operations being represented in Fig. 2. This partially-formed blank, Fig. 2, is then subjected to the action of the final swaging-dies C D, Fig. 16, thereby forming the metal into the form represented in Figs. 3 and 4, the same being mainly of semicircular form in cross-section or end view. In lantern-tubes one elbow is generally made on a curve of a larger radius than that of the other elbow, as shown in Fig. 3. The two ends of the blank might be first struck, if desired, in two different dies having, respectively, curves which correspond to the two elbows; but in order to save the expense of another die I prefer to strike both elbows first with a die which corresponds to the elbow having the lesser curve, as shown in Fig. 2, and then bring the elbow having the larger curve into its proper form, as shown in Fig. 3, by means of the final swaging-die. I make the blank a little wider than is necessary for forming the tubes and leave a portion to be trimmed off, so as to allow for some variation in placing the blank within the die, or slipping after it is placed between the dies. This surplus metal, which is to be trimmed off from the outer part, *a*, of the tube, is designated by the letter *b*. It may be trimmed off in dies or by any ordinary means, so as to leave the part *a* of the tube in the form represented in Fig. 11. The inner half of the tube *c* is operated upon in the same manner by means of the dies E F and G H, which produce the forms represented in Figs. 5, 6, 7, and 8. These forms are also made from a blank which is wide enough to admit of trimming off the edges of the flange *d*, to straighten the edges, and leave said flange of the proper width, as shown in Figs. 9, 10, and 11. After trimming, the two parts of the tube are placed together, as shown in Figs. 9 and 11, when the edges of the metal composing the part *a* are clinched down by dies, or in any proper manner, into the form represented in Fig. 10, to lock the two parts of the tube together. The ends of the completed tube may be sawed or otherwise cut off to bring them into the desired form with reference to the parts to which they are to be attached.

Inasmuch as the upper and lower dies in Fig. 13 represent correctly the dies A B and also the dies C D, I have omitted all reference-letters from such figure. The reference-letters are also omitted from the upper and lower dies in Fig. 15, which bear the same relation to the dies E F G H. The first or preliminary swaging-dies for either half of the tube are principally for swaging the elbow, while the final swaging-dies swage the body of the tube and correct any imperfections that may be found in the result of the previous dies. The form of these dies will be understood from the drawings. An important feature of them is that they are divided upon a line which corresponds to the curve of the tube on its longitudinal axis.

While the foregoing is the best mode known to me at present for carrying out my invention, the main advantages of my improvement may be reached by somewhat different steps and different dies.

The essential or most important feature of my improvement resides in striking the two parts of the tube from a straight blank or strip with the connecting-seam on both sides of the tube alike and following the curve of the tube on its longitudinal axis. Each part of the tube may be so struck at a single operation.

By my improvement I make a very large saving of stock, and I also produce a more desirable tube.

I claim as my invention—

As a new article of manufacture, the herein-described bent tube having a curved elbow portion and seams on both sides which follow the longitudinal axis of the tube, substantially as set forth.

Witness my hand this 23d day of June, 1887.

ALVIN TAPLIN.

Witnesses:
JENNIE SMITH,
DAN. A. MILLER.